May 26, 1970     K. K. MAGNANT     3,513,749

ROCKET LAUNCHER

Filed Oct. 25, 1968     2 Sheets-Sheet 1

Kenneth K. Magnant,
INVENTOR

Harry M. Saragovitz
Edward J. Kelly
Herbert Berl
Harold W. Hilton

BY

United States Patent Office 3,513,749
Patented May 26, 1970

3,513,749
ROCKET LAUNCHER
Kenneth K. Magnant, Huntsville, Ala., assignor to the United States of America as represented by the Secretary of the Army
Filed Oct. 25, 1968, Ser. No. 770,684
Int. Cl. F41f 3/04
U.S. Cl. 89—1.807          8 Claims

ABSTRACT OF THE DISCLOSURE

A light-weight, reusable rocket launcher. The launcher includes a plurality of launch tube assemblies held and supported in a cluster. The launch tube assemblies each comprise a rocket launch tube with an easily releasable detent and an igniter. The detent includes a member extending into the tube for engagement with the rocket and retention thereof in the tube during transportation of the launcher and for release of the rocket responsive to ignition thereof. A portion of the detent member extends longitudinally and externally of the tube and is provided with a cam surface on the distal end thereof. The igniter assembly includes a rocket tail engaging member including a longitudinally extending portion having a radially inwardly extending arm at one end thereof. The tail engaging member is spring biased between the tube and the rocket. A cam surface is provided on the opposite end of the longitudinally extending member for operation with the detent cam surface. An igniter head is carried by the tail engaging member, substantially along the longitudinal axis of the tube and is held in engagement with the rocket by the spring biased assembly. The tail engaging member is disposed for rotational movement for displacement of the igniter head from a first position of engagement with the rocket to a second position which clears the launch tube to permit rearward unloading or loading. Rotational movement of the tail engaging member effects engagement of the detent cam surface and the cam surface of the tail engaging member for simultaneous displacement of the detent for release of the rocket.

BACKGROUND OF THE INVENTION

Various types of military aircraft are equipped with rocket launchers including a plurality of launch tubes which are normally mounted adjacent to the fuselage or wing. Typically, the rockets are held in the launch tubes by a detent mechanism disposed in fixed relation to each tube and are fired by an igniter device secured to an arm which is mounted separately from the detent mechanism and engages the rocket at the rear thereof for ignition of the rockets.

In launchers of this type, vibration encountered by the aircraft during flight to a target may cause the non-fixed firing arms to swivel and inadvertently make contact with the adjacent tube and accidentally fire the rocket therein. Also the provision of a fixed igniter assembly prevents loading and unloading of the rockets from the rear. Additionally, the detent mechanism used in these conventional launchers must be released, should the aircraft return with rockets in the launch tubes, by inserting a tool into the tubes to exert an outward radial pressure against the detent for release thereof from the rocket. These and other similar and related problems are overcome by the apparatus of the pesent invention.

SUMMARY OF THE INVENTION

The apparatus of the present invention is a rocket launcher for launching rockets from aircraft and includes a plurality of launch tube assemblies maintained in a circular cluster by appropriate support structure. The launch tube assemblies include an igniter assembly and a detent device. The igniter assembly includes a rocket tail engaging member attached at the rear end of the launch tube and spring biased between the tube and rocket mounted therein. The tail engaging member includes an arm having, at one end thereof, an igniter carried substantially along the longitudinal axis of the tube and held in contact with the rocket by the spring biased assembly. The igniter may be rotated from a first position of engagement with the rocket to either a second or a third position which clears the launch tube, thereby allowing loading and unloading from the rear. The igniter assembly also serves as a stop to prevent excessive rearward movement of the rocket. The detent device includes a longitudinally extending arm having a member, at one end thereof, that extends through an opening in the side of the launch tube and engages the rocket, retaining the rocket within the tube during transportation of the launcher and releasing the rocket in response to ignition thereof. A pair of cam members are respectively provided at the distal ends of the arm of the tail engaging member and the arm of the detent device for engagement and release of the rocket engaging member from the rocket responsive to rotation of the igniter arm.

It is an object of the present invention to provide a pivotable firing or igniter assembly that will release a rocket within a launch tube simultaneously with the pivoting of the firing arm.

Another object of the present invention is to provide a pivotable igniter assembly that eliminates unnecessary swiveling of the firing arm once the arm is in firing position, thus preventing inadvertent firing of other rounds and also preventing wire breakage.

Still another object of the present invention is to provide an igniter assembly which serves as a stop for a rocket and is also resiliently mounted to ensure continuous engagement of the igniter with the rocket even during extreme vibrations.

DESCRIPTION OF THE PREFERRED EMBODIMENT

Figure 1:
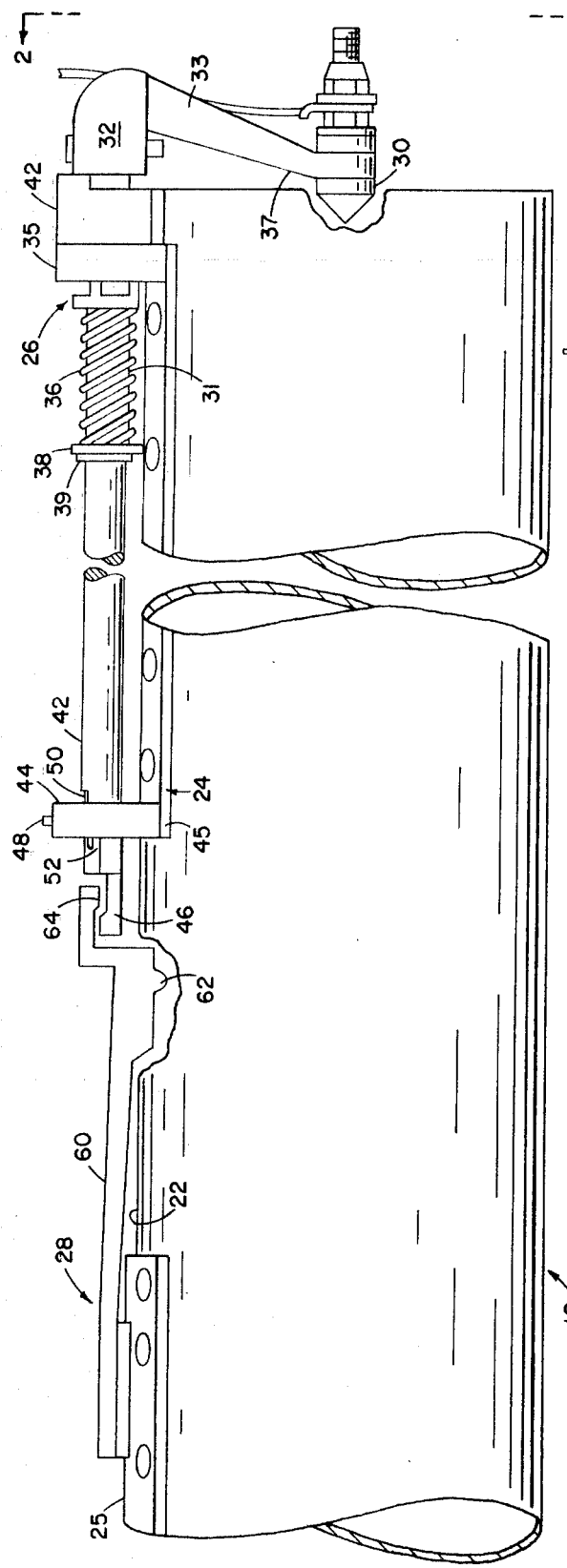
FIG. 1 is a side view of a launch tube assembly.

Referring now to the drawings wherein like numerals represent like parts in all figures, and wherein there is disclosed a preferred embodiment of the present invention. A rocket launcher 10 includes a plurality of launch tube assemblies 12 held in a circular cluster by support structure 14. Rocket launcher 10 is primarily for use on rotary wing aircraft where its non-aerodynamic design would impose only insignificant drag penalties on the aircraft. However, it can be used on fixed wing aircraft where the additional drag is of little concern, or if desired, the launcher may be provided with fairings to reduce the drag when used on high speed aircraft.

Each launch tube assembly 12 consists of a launch tube 22, support brackets 24 and 25, an igniter assembly 26 and a detent device 28. Brackets 24 and 25 are mounted near the aft end of launch tube 22 and serve as a support for igniter assembly 26 and detent 28. Igniter assembly 26 and detent device 28 may be attached to brackets 24 and 25 with a readily removable means, such as screws (not shown). Detent 28 is a leaf spring latch that extends into tube 22 to hold the round in the launch tube until it is fired. The detent also serves as a ground contact in the firing circuit. The igniter assembly includes an arm 32 spring biased to bracket 24 and having an igniter head 30 thereon for contact with the rocket to ignite the propellant therein.

As shown in FIG. 1, igniter assembly 26 includes the igniter arm 32 having a first longitudinally extending portion 31 which is rotatably mounted in a support member 35 extending upwardly from bracket 24, and a second portion 33 extending radially inwardly toward the longitudinal axis of tube 22. An igniter head 30 is secured to the distal end 37 of arm portion 33 substantially coincident with the longitudinal axis of the tube.

Spring 36 is circumferentially mounted about arm portion 31 and seated between a spring retainer 38 and support member 35. A cylindrical shaft 42 of firing arm 32 projects through support 35 and spring 36. Spring 36 is then compressed between support member 35 of bracket 24 and a spring retainer 38, which is held to shaft 42 by a snap ring 39. In the firing position firing arm 32 projects over the rear end of the tube to intersect the longitudinal axis of the tube. Igniter head 30 is fixed to the end of arm 32 and extends a predetermined maximum distance into the tube 22 for contacting a rocket within the tube 22. The rocket is located in the tube so that its contact with igniter head 30 causes further compression of spring 36. Thus, after loading, spring 36 allows the igniter head 30 to maintain contact with the rocket during any longitudinal motion of the rocket prior to launch. In the same manner spring 36 and arm 32 will prevent excessive movement of the rocket toward the rear, movement of the rocket being limited by the maximum compressibility of the spring.

In igniter assembly 26, shaft 42 extends through a flange 44 at the end 45 of bracket 24. The cylindrical portion of shaft 42 extends beyond flange 44 by a distance equal to at least the distance spring 36 can be compressed. Thus when firing arm 32 is pulled away from the aft end of tube 22 prior to rotation, a cylindrical portion of shaft 42 will remain within flange 44. A machined end of shaft 42 forms a cam 46 with a raised flat surface that faces away from and parallel with the tube 22 when the firing arm 32 is in the firing or central position. A dowel pin 48 projects through flange 44 and into a groove 50 (shown in FIG. 4) in shaft 42. This groove 50 and pin 48 will prevent rotation of igniter assembly 26 until firing arm 32 is pulled away from the aft end of tube 22. When arm 32 is pulled out and rotated, pin 48 is aligned with slots or grooves 52 on either side of groove 50. The igniter assembly can be rotated to either side as desired.

Figure 4:
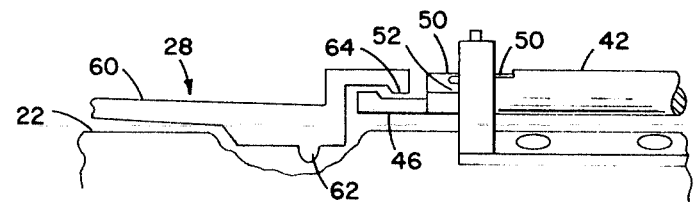
FIG. 4 is a partial elevational view illustrating the firing arm and detent arm in disengaged position.
Figure 5:
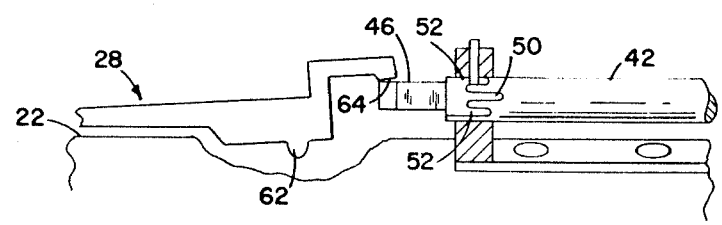
FIG. 5 is a view similar to FIG. 4 with the firing arm cam and detent arm cam in engaged position.

As seen in FIGS. 1, 4, and 5, detent 28 has an arm 60 projecting from support structure 25 toward the aft end of the tube 22. An elongated tooth 62 on arm 60 projects through an opening in the side of tube 22 to engage a groove on the rocket periphery, retaining the rocket until released in response to forward motion of the rocket or externally. As observed in the drawings, tooth 62 has a curved surface which engages the rocket groove. Detent 28 also provides an electrical ground to the rocket through tooth 62. The end of arm 60 is machined to form a cammed surface 64 having a flat end that faces toward and is approximately parallel with tube 22 and is in longitudinal alignment with shaft 42. Surface 64 is positioned over the cam 46 of shaft 42 and is responsive thereto, the two flat surfaces coming together when igniter arm 32 is pulled out and surface 64 being lifted by arm 42 when arm 32 is rotated counterclockwise to disengage tooth 62. Clockwise rotation of igniter arm 32 merely disengages the surfaces allowing only the firing arm 32 to be rotated.

FIGS. 4 and 5 show in greater detail the relationship between detent 28 and arm 42 of igniter assembly 26. In FIG. 4 the compression spring 36 (not shown) is in a state of least compression, thereby allowing the maximum overlap of the detent 28 and cam 46 with little or no contact between the two. The relationship between grooves 50 and 52 are noted to have a common area at the end of shaft 42, but are separated further along the grooves. The force created by spring 36 will maintain pin 48 in the specific groove in which it has been placed until it is manually rotated, thereby preventing any undesired rotation of the igniter assembly 26. FIG. 5 shows the shaft 42 rotated through a predetermined angle less than 90 degrees wherein cam 46 has engaged and lifted arm 60, thereby disengaging tooth 62.

Figure 2:
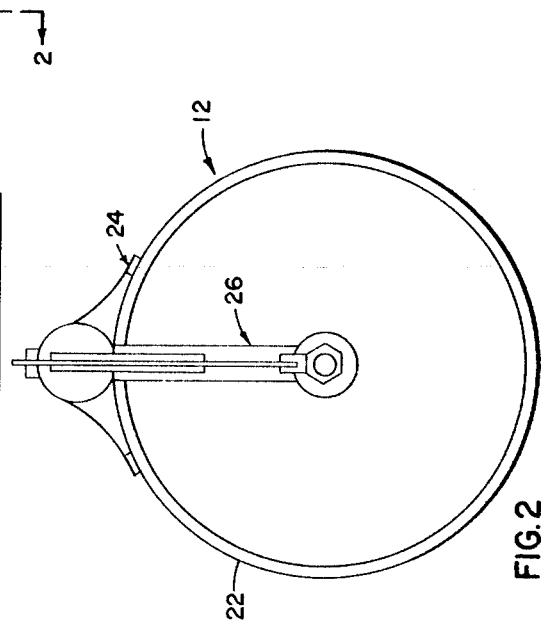
FIG. 2 is an end view of FIG. 1 taken along line 2—2.
Figure 3:
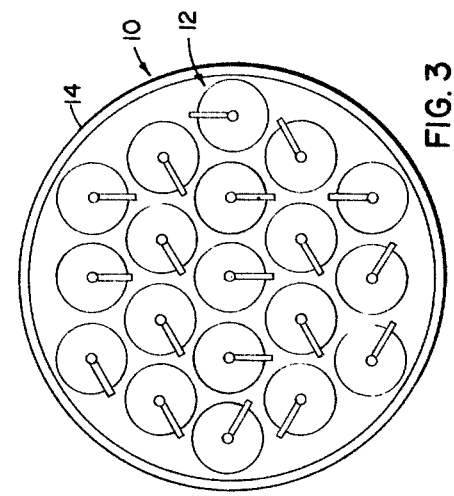
FIG. 3 is an end view of a rocket launcher embodying a launch tube assembly.

In preparing tube 22 for loading or unloading, FIGS. 2 and 5 disclose the operating components. To place igniter assembly 26 in a loading position, firing arm 32 is lifted from the rear of tube 22, further compressing spring 36 and clearing igniter head 30 with respect to the tube 22. While spring 36 is compressed firing arm 32 is pivoted clockwise to allow one of the grooves 52 to engage pin 48 and hold the arm 32 clear of the aft end of tube 22. Detent 28 remains unmoved and tooth 62 remains in position to engage a rocket loaded from the rear. If it were desirous to load a rocket from the front of tube 22, it would not be necessary to disengage firing arm 32 from the central position wherein dowel pin is in groove 50.

To unload a rocket from the rear of tube 22, firing arm 32 is lifted and pivoted counterclockwise to allow the other groove 52 to engage pin 48. This counterclockwise rotation causes cam 46 to engage cammed surface 64 of detent 28, thereby lifting arm 60 and disengaging tooth 62. A rocket may then be easily removed from the tube 22.

A replaceable wiring harness and conduit serve to electrically connect the rocket launcher to the aircraft for triggering the rockets. From the foregoing description it is obvious that although a cluster of 19 launch tube assemblies is disclosed, the cluster may well be of a different quantity, depending on the capabilities and mission of the aircraft.

Figure 6:
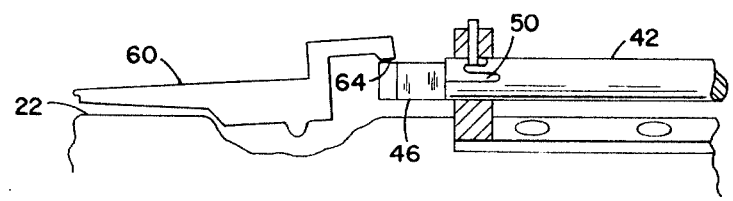
FIG. 6 is a view similar to FIG. 5.

Another embodiment of the igniter assembly and detent mechanism is shown in FIG. 6 wherein the arm 42 is designed for rotation to only one side of the central position. Shaft 42 is shown rotated to the loading or unloading position. Cam 46 is disposed in engagement with arm 60 for displacement so that a rocket being loaded would not engage tooth 62 until the firing arm was rotated back to the central position or firing position.

A similar device is disclosed in a copending application entitled "Airborne Rocket Launcher" by Earl C. Ricks, Donald J. Conn, and Wiley B. Vickers, filed simultaneously with applicant's disclosure on Oct. 25, 1968, Ser. No. 770,492, and assigned to the U.S. Government as represented by the Department of the Army.

I claim:

1. A rocket launch tube assembly including a cylindrical elongated launch tube, detent means for engaging said rocket for retention thereof within said tube and for release thereof responsive to ignition of said rocket, firing means releasably engaging said rocket for ignition thereof within said tube, said firing means being pivotally secured to said tube and disposed for manual, pivotal displacement from a first position of engagement with said rocket to a second position of disengagement from said rocket for the manual removal thereof from said tube, a first cam means disposed adjacent the distal end of said firing means, and a second cam means carried adjacent the distal end of said detent means, said first and second cam means disposed for coaction therebetween for disengagement of said detent means from said rocket responsive to displacement of said firing means from said first to said second position.

2. A launch tube assembly as set forth in claim 1 wherein said tube is provided with an opening in the side thereof, said detent means is provided with an arm having a tooth on one side thereof for projecting through said opening for engaging a groove on said rocket.

3. A launch tube assembly as set forth in claim 2 wherein said firing means is an igniter assembly attached near the rear of said launch tube and comprising a rotatable cylindrical shaft, a firing arm mounted on one end of said shaft for rotation therewith and projecting into the rear of said launch tube substantially along the rocket longitudinal axis for engagement with said rocket, a firing head or rocket triggering contact attached to the end of said firing arm, said firing arm being spring biased between said rocket and said tube to maintain contact with the rocket, the other end of said shaft being said first cam means and being aligned in close proximity with said second cam means disposed on the distal end of said engaging arm adjacent said tooth.

4. A launch tube assembly as set forth in claim 3 wherein said cylindrical shaft includes first, second, and third grooves in the shaft adjacent to said first cam thereon, said grooves being longitudinal along said shaft, said first and third grooves being equidistant from and on opposite sides of said second groove and having angular displacements therebetween of not more than 90 degrees, said grooves having a grooved area common to all grooves and adjacent to said first cam, and further comprising a support structure encircling said grooves, said structure holding a pin or rod that protrudes into said second groove for preventing random rotation of said shaft.

5. A launch tube as set forth in claim 4 wherein either of said first and third grooves may be engaged with said pin by lifting and rotating said firing arm, rotating said firing arm in a clockwise direction placing said first groove under said pin and counterclockwise rotation of said firing arm placing said third groove under said pin, counterclockwise rotation also causing said first cam to engage with said second cam and lift said engaging and holding arm to remove said tooth from the launch tube opening and said firing arm being rotatable a distance sufficient to clear the end of said launch tube.

6. A launch tube assembly as set forth in claim 5 wherein said spring biasing is a coiled spring enclosing a portion of said shaft and partially compressed between a fixed point on said shaft and a flange attached to said launch tube.

7. A launch tube as set forth in claim 3 wherein said cylindrical shaft has first and second grooves in the shaft adjacent to said first cam, said grooves being longitudinal along said shaft, and having an angular displacement therebetween of less than 90 degrees, said grooves having a grooved area common to both and adjacent to said first cam, and further comprising a support structure encircling said grooves, said structure holding a pin or rod that protrudes into said second groove for preventing random rotation of said shaft.

8. A launch tube as set forth in claim 7 wherein said spring biased firing arm is biased by a coil spring that encompasses a part of said shaft and is partially compressed between a fixed point on said shaft and a flange attached to said launch tube, and said first groove can be engaged with said pin by lifting and rotating said firing arm, rotation of said firing arm causing said first cam shaft to engage with and lift said engaging and holding arm cam thereby removing said tooth from said launch tube opening, said firing arm being rotatable a distance sufficient to clear the rear end of said launch tube for loading or unloading of a rocket.

References Cited

UNITED STATES PATENTS

| 2,460,929 | 2/1949 | Goff  | 89—1.807 |
| 2,685,232 | 8/1954 | Brandt | 89—1.813 |
| 2,712,270 | 7/1955 | Green | 89—1.807 |
| 2,938,431 | 5/1960 | Dixon | 89—1.807 |

SAMUEL W. ENGLE, Primary Examiner

U.S. Cl. X.R.

89—1.814